US008819453B1

(12) United States Patent
Murray

(10) Patent No.: US 8,819,453 B1
(45) Date of Patent: Aug. 26, 2014

(54) PROTECTION OF USER-GENERATED INFORMATION IN THE CLOUD

(75) Inventor: Abraham Phelps Murray, Scituate, MA (US)

(73) Assignee: Google Inc.., Mountain View, CA (US)

(*) Notice: Subject to any disclaimer, the term of this patent is extended or adjusted under 35 U.S.C. 154(b) by 0 days.

(21) Appl. No.: 13/397,625

(22) Filed: Feb. 15, 2012

(51) Int. Cl.
*H04L 29/06* (2006.01)

(52) U.S. Cl.
USPC ............................. 713/193; 713/165; 726/26

(58) Field of Classification Search
CPC ......... G06F 21/60; G06F 21/10; G06F 21/62; G06F 12/14; H04L 63/0428
See application file for complete search history.

(56) References Cited

U.S. PATENT DOCUMENTS

| 2007/0192617 | A1* | 8/2007 | Brickell | ....................... 713/183 |
| 2012/0011364 | A1* | 1/2012 | Rubin | ........................... 713/168 |
| 2012/0269116 | A1* | 10/2012 | Xing et al. | ..................... 370/328 |

* cited by examiner

*Primary Examiner* — Izunna Okeke
(74) *Attorney, Agent, or Firm* — Fenwick & West LLP

(57) ABSTRACT

Data is protected from unauthorized access with a combination of technological and legal means. A technological measure is used to control access to a user created data package including a work of original authorship and user data, thus enabling the Digital Millennium Copyright Act to be invoked, thereby making it illegal for a service provider to access the user data without authorization from the creator of the data package. In other instances, data is sent to a cloud service provider in an encrypted format by a user. When the user wishes to authorize access to the data, the user provides a decryption key, which may be generated from the original work, and in some instances, is valid only for a limited period of time. Thus, access to the encrypted data can be effectively controlled by the user, even when it is stored in the cloud.

42 Claims, 3 Drawing Sheets

PROTECTION OF USER-GENERATED INFORMATION IN THE CLOUD

TECHNICAL FIELD

The disclosure relates generally to the field of data protection, and specifically to systems and methods for allowing users to securely provide information to cloud service providers.

BACKGROUND

The rise of cloud-based products and services is well known. Consumers interact with such services in innumerable ways. To use one common example, students use electronic books from cloud providers (e.g., GOOGLE BOOKS™) to read books on their laptop computers in dorm rooms, and then continue reading from the same spots in the books on their smart phones while on a campus bus. To make such functionality available, cloud providers typically keep track of certain information related to each user, such as which books the user's account has been authorized to read, and where in the book the user last stopped reading.

A concern that arises with widespread use of cloud products and services is the risk that a cloud provider, or a third party, may attempt to access the user's information for purposes that the user has not authorized. In one extreme example, users might be concerned that a political or governmental organization might try to learn how much time the user spends with various types of books.

Encryption is a known method of making data difficult to access for users who have not been authorized, but use of traditional encryption techniques often require significant computing overhead and user involvement. Furthermore, some parties (e.g., the vendors themselves or government agencies) may believe they have certain rights to access data while end users take a different view of the extent of such authorization.

Another mechanism for protecting information is through legal means. Software vendors, for example, often distribute their products and services via license agreements that impose specific restrictions on what the users can do with the licensed software. Adding further to such protection, in 1998 the United States implemented as part of its copyright law the Digital Millennium Copyright Act (DMCA), certain provisions of which include "anti-circumvention provisions" (see, e.g., 17 U.S.C. §1201(a)) that in general terms make it illegal to disable technological protection measures in electronic devices (e.g., DVDs and DVD players, video games and other computer software or hardware).

While vendors have used encryption, DMCA protections and other mechanisms as a means of protection, to date systems have not been developed to permit users of cloud services to take advantage of similar protections.

It is generally desirable for consumers to have mechanisms and systems that ensure the protection of information they may provide in connection with use of cloud-based offerings.

SUMMARY

Methods for protecting a set of data from unauthorized access are disclosed, as well as computing systems for performing those methods. In one aspect, a data package comprising a set of data and an original work of authorship not related to the set of data is received. The data package is protected against unauthorized access by a technological measure that utilizes the original work of authorship. The computing device receives authorization to access the set of data, and the set of data is accessed in accordance with the technological measure by a processor.

In another aspect, the original work of authorship is included in a header portion of the data package. In other aspects, the original work of authorship comprises a body of text and an image. In a further aspect, the set of data is deleted a pre-determined amount of time after it has been received. In yet another aspect, the authorization is limited to a specified use of the set of data. In a yet further aspect, the authorization is only valid during a specified time range.

In some aspects, the set of information comprises user activity data. In one such aspect, the user activity data comprises at least one of a position in a book currently being read by a user, and a list of books that have been accessed by the user.

In some aspects, the technological measure comprises encryption. In one such aspect, the original work of authorship contributes to the generation of an encryption key. In another such aspect, the original work of authorship comprises a first portion and a second portion. The first portion contributes to the generation of an encryption key and both the first and second portions contribute to the generation of a decryption key. In yet another such aspect, receiving authorization to access the set of data comprises receiving a decryption key for decrypting the data package.

In a further aspect, the method further comprises generating a response to the data package that includes the original work of authorship. Protection against unauthorized access is added to the response using a second technological measure, and the response is sent.

DETAILED DESCRIPTION

One aspect of the disclosed system, method and computer program product allows users of cloud-based products and services (collectively, "cloud facilities") to ensure, via both technological and legal means, that material which is provided while using the cloud facilities will not be used for purposes not authorized by the user. In some embodiments existing legal protections are used to enforce technological means for protecting user data. In other embodiments, technological means are the primary form of data privacy protection, with existing legal protections being of secondary importance, or even absent entirely.

Figure 1:
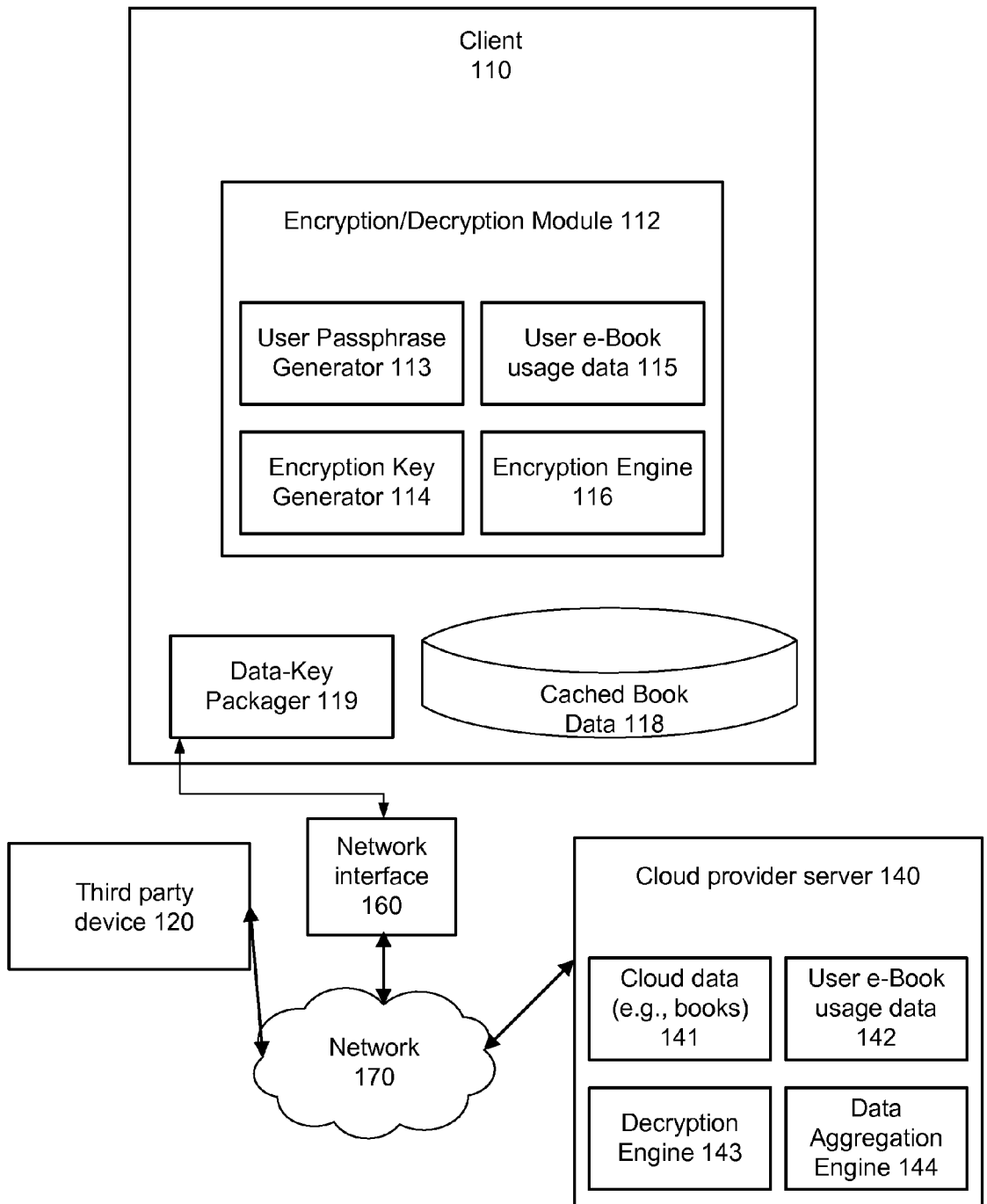
FIG. 1 is a high-level block diagram of a networked computing environment according to one embodiment.

FIG. 1 shows a networked computing environment 100 including various modules, consistent with one embodiment. A client device 110 represents an end-user's computer, e.g., a laptop computer or smartphone. An encryption/decryption module 112 manages the encrypted transmission of user-sourced information to cloud service provider 140 via data-key packager 119, network interface 160 and network 170, as described in detail below. In one embodiment, cached book data storage 118 holds locally in client 110 certain books that the user has requested and which have been downloaded from the cloud data 141 (e.g., electronic book libraries) sourced at cloud provider server 140. In other embodiments, cached book data 118 represents only a small cache of chunks of books pertinent to what a user is currently accessing.

In one specific embodiment, a user and a cloud provider have entered into an agreement under which the provider is to make available certain content (e.g., a library of electronic books) to the user. In exchange, the user agrees to certain terms, such as payment of money and allowing the provider to collect certain information that may be required or desirable in connection with the service, e.g., keeping track of which books the user has been reading and what page the user has most recently read. Such data is collected and stored in a subsystem identified in FIG. 1 as user e-Book usage data 115. In one embodiment, the vendor and the user also agree that the vendor is only to use such data for specified purposes, for instance keeping such user bookmarks and aggregating data with other users concerning popularity of a book, how much time people spend reading that book, and the like. In a related embodiment, the vendor agrees not to use this data for any other purpose and not to keep such data for any longer than needed for the authorized purposes.

In some embodiments, a user passphrase generator 113 allows the user to enter a body of text, such as a special question and answer pair. For instance, the user may enter the following in response to user interface prompts for a user-generated question-answer pair: Question: Why is Tuesday the best day of the week? Answer: Because it's twice as much as one day. In one embodiment, the user is encouraged to be creative and whimsical in generating the passphrase in order to ensure that the user-generated passphrase is copyrightable subject matter. The user passphrase is employed by encryption key generator 114 to create a pair of keys—one to encrypt the usage data 115 and one to be used at the provider server 140 to decrypt the usage data.

In one embodiment, the question portion of a passphrase is used as part of a decryption key, and the entirety of the passphrase (question and answer) is used as part of the encryption key. This is done to trigger applicability of the DMCA anti-circumvention provisions. Specifically, data-key packager 119 bundles the usage data 115 with the decryption key that includes the user's copyright-protected text and sends the bundle to cloud provider server 140. To the extent that the cloud facility, or a third party (represented by third party device 120), might wish to obtain unauthorized access to the information from client 110, such person would be legally prevented from doing so by the DMCA anti-circumvention provisions, since the technological measure that protects access to the user data 115 also protects access to the user-generated copyright-protected text.

In other embodiments, the user data 115 and the original work are packaged together and encrypted using a one-time pad ("OTP") encryption algorithm. The cloud provider server 140 can only decrypt the user data 115 if the provider has been notified by client 110 of which decryption "page" to use. In one such embodiment, the information regarding which page to use is only held at cloud provider server 140 for a limited time, say 5 minutes, after which the cloud provider server 140 must request the information again from client 110. In this way, the cloud provider server 140 can only access the usage data 115 if the user corresponding to the usage data is logged into the server 140 from client 110.

In further embodiments, other schemes for joining copyright-protected works with other data to be protected are used. For example, in one embodiment, every transmission of usage data is accompanied by a user-generated header of copyright protected material, and then encrypted using any suitable encryption method (e.g., public key encryption according to the well known RSA technique). Aside from contractual, trade secrecy and data privacy laws intended to dissuade the cloud facility or a third party from making unauthorized use of the usage data, user transmissions configured in this manner are also subject to the protection of the anti-circumvention provisions of the DMCA.

In still further embodiments, well known techniques for providing time-limited authentication for user access are used to control access to the usage data 115 associated with a specific user. In one such embodiment, Google's open source product GOOGLE AUTHENTICATOR™ is used to provide access authorization to the usage data 115 for a limited amount of time after a user indicates their permission by supplying a PIN. GOOGLE AUTHENTICATOR™ is described in further detail on the webpage: http://www-.google.com/support/a/bin/answer.py?answer=1037451, the contents of which are incorporated herein by reference. The length of time for which authorization to access the user data 115 is configurable, and typically will differ depending on the nature of the user data 115. For example, keeping an electronic bookmark in a book may be considered desirable for a period of a week but not a month, so usage data related to a bookmark is in this embodiment uses a decryption key that expires after, say, 15 days. As another example, in some environments access authorization is set, as a default, to be operable only for the short period of time they are expected to be needed for real-time processing at the provider server 140, e.g., five minutes after the user authorizes such access.

In various embodiments, the data-key packager 119 combines the user data and the user-generated content (e.g., a copyright-protected sentence) together and sends them, via a conventional network interface 160 and network 170 (e.g., the Internet) to cloud provider server 140 at a cloud facility.

In the illustrated embodiment, cloud provider server 140 uses decryption engine 143 to decrypt what the user has sent and processes the information in a manner appropriate to the environment of the cloud facility, for instance by storing a bookmark in user e-Book usage data 142 and aggregating reading-related statistics using data aggregation engine 144 to determine how closely read a book is, how frequently people who start the book actually complete the book, and other statistics that can be used to enhance community knowledge about books in the cloud provider's library of available titles. In embodiments where encryption is not used, other forms of unpacking engine are used in place of decryption engine 143 to unpack and process data packages received from the user, as well as pass relevant data on to the data aggregation engine 144.

Additionally, the same manner of protection can be provided to the user for communications from the cloud facility back to client 110. For example, a user may not wish anyone to know what books the user has asked to access or how much time the user has spent reading any particular portion of any particular book. By packaging and encrypting information sent from the cloud provider server 140 back to client 110 with a user-provided copyrighted text header, for example, the user can invoke the same DMCA protections to dissuade the cloud facility or a third party from attempting to circumvent the technological protection measures described above.

Computing System Architecture

Figure 2:
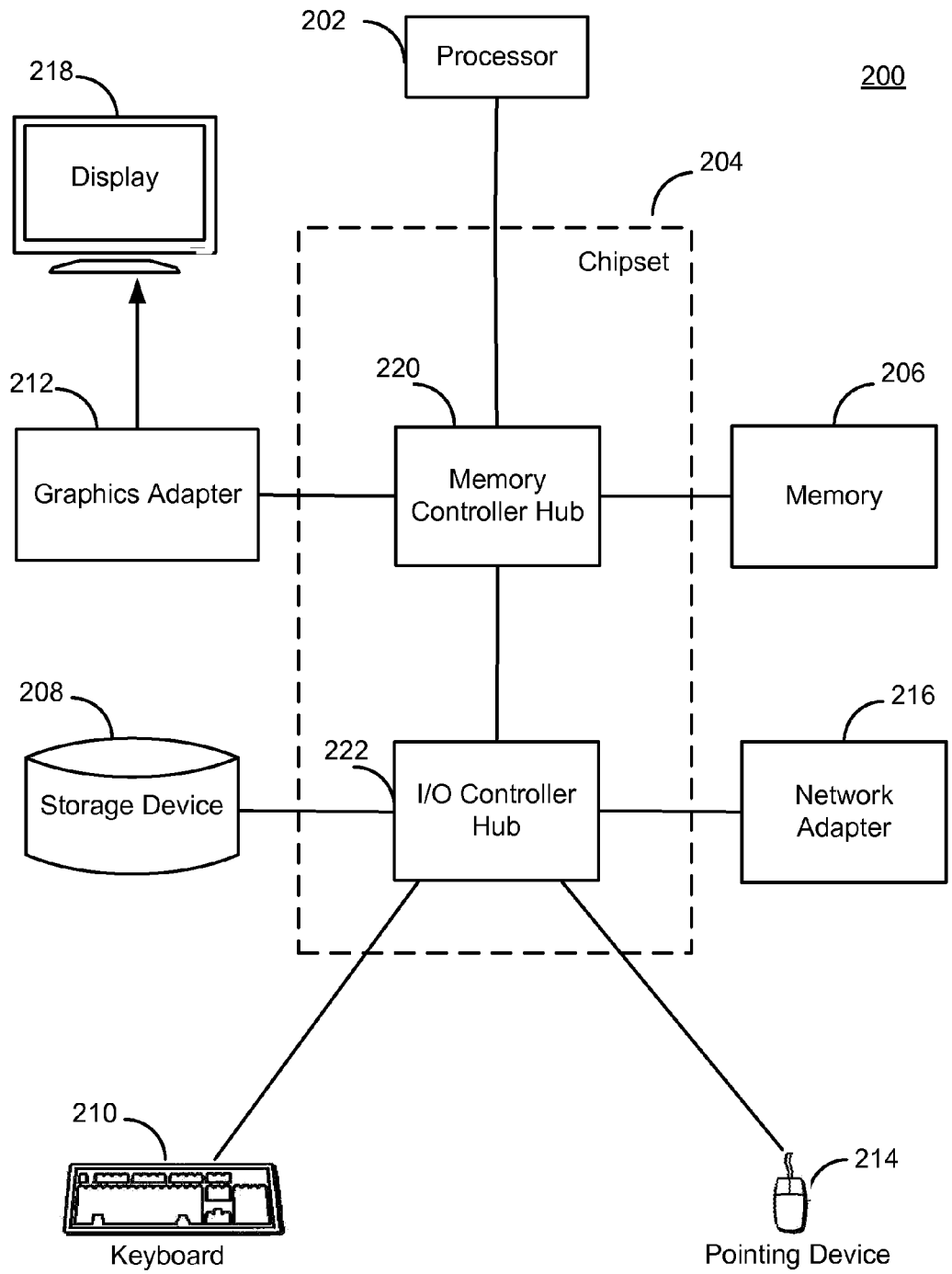
FIG. 2 is a high-level block diagram illustrating an example of a computer for use in the computing environment shown in FIG. 1 according to one embodiment.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

Figure 3:
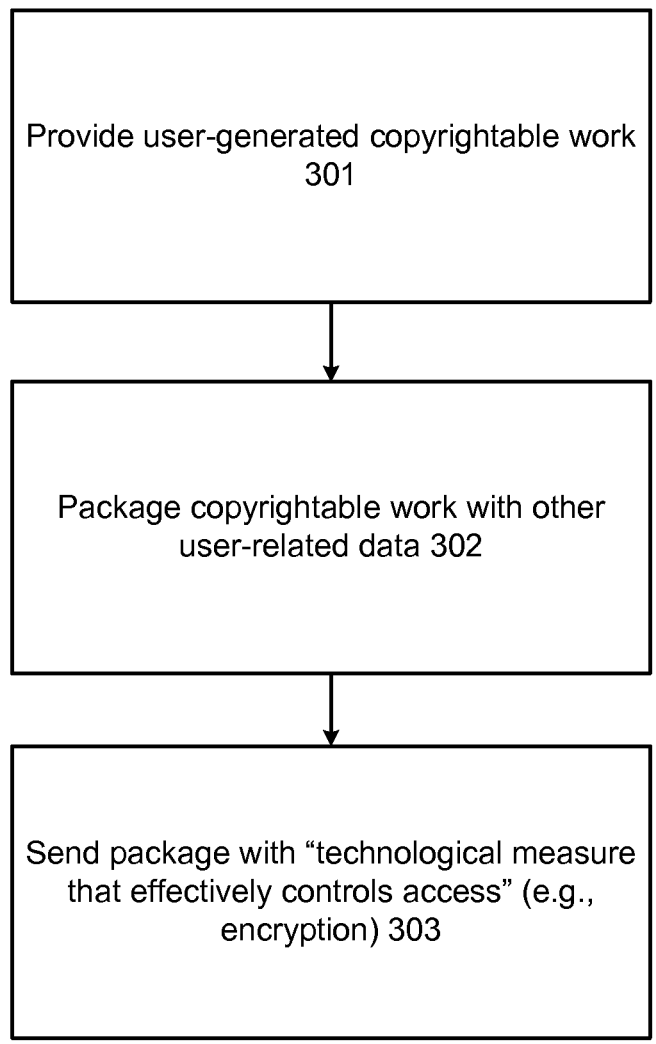
FIG. 3 is a high-level block diagram illustrating processing steps according to one embodiment.

The types of computers used by the entities and processes of FIGS. 1 and 3 can vary depending upon the embodiment and the processing power required by the entity. For example, the video corpus might be stored in a distributed database system comprising multiple blade servers working together to provide the functionality described herein. The computers can lack some of the components described above, such as keyboards 210, graphics adapters 212, and displays 218.

FIG. 3 is a high-level flow diagram illustrating processing 300 in accordance with the computing environment 100 of FIG. 1. This embodiment is used to take advantage of legal protections provided by the DMCA to provide supplementary protection against unauthorized use of user-related information (e.g., books that a consumer is reading). Specifically, processing 300 commences with a step 301 of a user generating a work protected by copyright. Rights under copyright law come into existence automatically upon an author creating a work; while there are advantages to registering a copyright, the copyright is created automatically upon an author creating the work, so long as it is original and fixed in a tangible medium of expression (e.g., stored in a computer memory). Thus, as long as a user drafts an original sentence or two (short phrases or expressions have been found insufficient for copyright protection), or alternately provides other qualifying material such as an original drawing, that work will be afforded the protection of copyright law.

In step 302, the user's sentence or other work is packaged with other material related to the user, for example historical information regarding the user's reading history. Often, factual data such as the books a user has accessed may not be afforded copyright protection to the user, typically for two reasons: (1) the user is not typically the "author" of such material; and (2) the material may not qualify for copyright protection in any event (as data listings may not include the requisite originality and there may be "merger" of any ideas and expressions of ideas in the listings, rendering copyright inapplicable).

In step 303, the package is sent (e.g., from the user's computer to the cloud facility) using some "technological measure that effectively controls access" as set forth in the DMCA (17 U.S.C. §1201(a)). As described above in connection with FIG. 1, an encryption subsystem is used in one embodiment as such a technological measure. In other embodiments, different technological measures are used, such as requiring a hardware dongle to be connected and requiring a password be entered at the client 110. One of skill in the art will recognize many other such technological measures may be used to protect access to the package without deviating from the scope of this disclosure. Because the technological mechanism is used to control access to a user's copyrightable work, the DMCA precludes the cloud vendor or a third party from attempting to circumvent this access control measure. Thus, the inclusion of a copyrighted work adds the supplemental legal protection of the DMCA to other technological and legal protections the user may have to prevent unauthorized access to information about the user's activities.

An artifact of use of access control mechanisms such as encryption has been that material not protected by copyright (e.g., DVD versions of works in which the copyright has expired or been disclaimed) cannot be accessed because the DMCA precludes circumvention of the technology that is used to control access to copyrighted works. Here, that artifact is employed beneficially to limit unauthorized access to a consumer's personal information that the consumer likely wishes to keep private.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the client 110 and/or cloud provider server 140. Alternatively, hardware or software modules may be stored elsewhere within the networked computing environment 100. The networked computing environment 100 includes hardware elements necessary for the operations described here, including one or more processors, high speed memory, hard disk storage and backup, network interfaces and protocols, input devices for data entry, and output devices for display, printing, or other presentations of data.

Numerous variations from the system architecture of the illustrated computing environment 100 are possible. The components of the environment 100 and their respective functionalities can be combined or redistributed. For example, the encryption/decryption module 112 can be distributed among any number of physical devices, or the functionality provided by client 110 and cloud provider server 140 may be implemented on different computing devices than shown within the environment 100.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for protecting user data from unauthorized access. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope as defined in the appended claims.

What is claimed is:

1. A method for protecting data from unauthorized access, the method comprising:
   receiving a data package at a computing device, the data package comprising a set of data to be protected and an original work of authorship obtained via user input responsive to a prompt, the original work of authorship not related to the set of data, wherein the data package is protected against unauthorized access by a technological measure such that the set of data is further protected by the DMCA's anti-circumvention provisions by virtue of being protected by the technological measure that also protects the original work of authorship;
   receiving authorization, at the computing device, to access the set of data; and
   accessing the set of data in accordance with the technological measure, by a processor of the computing device.

2. The method of claim 1, wherein the original work of authorship makes up part of a header portion of the data package.

3. The method of claim 1, wherein the original work of authorship comprises a body of text.

4. The method of claim 3, wherein the body of text comprises a question and answer pair.

5. The method of claim 1, wherein the original work of authorship comprises an image.

6. The method of claim 1, further comprising deleting the set of data a pre-determined time after receiving the data package.

7. The method of claim 1, wherein the authorization is limited to a specified use of the set of data.

8. The method of claim 1, wherein the authorization is only valid during a specified time range.

9. The method of claim 1, wherein the set of data comprises user activity data.

10. The method of claim 9, wherein the user activity data comprises at least one of a position in a book currently being read by a user, and a list of books that have been accessed by the user.

11. The method of claim 1, wherein the technological measure comprises encryption.

12. The method of 11, wherein the original work contributes to generation of an encryption key.

13. The method of claim 12, wherein the original work of authorship comprises a first portion and a second portion, the first portion contributing to generating the encryption key and both the first and second portions contributing to generating a decryption key.

14. The method of claim 13, wherein the first portion is a question and the second portion is an answer to the question.

15. The method of claim 11, wherein receiving authorization comprises receiving a decryption key for decrypting the data package.

16. The method of claim 1, further comprising:
   generating a response to the data package, the response including the original work of authorship;
   adding protection against unauthorized access to the response using a second technological measure; and
   sending the response.

17. A data protection system, comprising:
   a network interface configured to receive a data package from a client device, the data package comprising a set of data and an original work of authorship obtained via user input responsive to a prompt, the original work of authorship not related to the set of data, wherein the data package is protected against unauthorized access by a technological measure such that the set of data is further protected by the DMCA's anti-circumvention provisions by virtue of being protected by the technological measure that also protects the original work of authorship;
   an unpacking engine, communicatively coupled to the network interface and configured to receive the data package therefrom, wherein the unpacking engine is further configured to access the set of data in accordance with the technological measure; and
   a processing engine communicatively coupled with the decryption engine and configured to receive therefrom and process the set of data.

18. The system of 17, wherein the technological measure comprises encryption and the original work contributes to generation of an encryption key.

19. The system of claim 18, wherein the original work of authorship comprises a first portion and a second portion, the first portion contributing to generating the encryption key and both the first and second portions contributing to generating a decryption key.

20. The system of claim 17, wherein the processing engine is further configured to generate a response to the data package, the response including the original work of authorship, and further comprising a packing engine configured to add protection against unauthorized access to the response using a second technological measure.

21. A method for protecting data from unauthorized access, the method comprising:
- prompting a user to provide an original work of authorship;
- obtaining the original work of authorship via user input;
- selecting a set of data to be protected, the set of data not related to the original work of authorship;
- creating a data package by a processor of a first computing device, the package comprising the set of data and the original work of authorship;
- adding protection against unauthorized access to the data package using a technological measure such that the set of data is further protected by the DMCA's anti-circumvention provisions by virtue of being protected by the technological measure that also protects the original work of authorship; and
- sending the data package to a second computing device.

22. The method of claim 21, wherein the original work of authorship makes up part of a header portion of the data package.

23. The method of claim 21, wherein the original work of authorship comprises a body of text.

24. The method of claim 23, wherein the body of text comprises a question and answer pair.

25. The method of claim 21, wherein the original work of authorship comprises an image.

26. The method of claim 21, wherein the set of data comprises user activity data.

27. The method of claim 26, wherein the user activity data comprises at least one of a position in a book currently being read by a user, and a list of books that have been accessed by the user.

28. The method of claim 21, wherein the technological measure comprises encryption.

29. The method of 28, wherein the original work of authorship contributes to generation of an encryption key.

30. The method of claim 29, wherein the original work comprises a first portion and a second portion, the first portion contributing to generating the encryption key and both the first and second portions contributing to generating the decryption key.

31. The method of claim 30, wherein the first portion is a question and the second portion is an answer to the question.

32. The method of claim 21, further comprising:
receiving a response including the original work of authorship, the response being protected against unauthorized access using a technological measure.

33. The method of claim 21, further comprising sending authorization to access the data package to the second computing device.

34. The method of claim 33, wherein the authorization is limited to a specified use of the set of data.

35. The method of claim 33, wherein the authorization is only valid during a specified time range.

36. The method of claim 33, wherein the technological measure comprises encryption and sending authorization comprises sending a decryption key for decrypting the data package.

37. A data protection system, comprising:
- a user interface configured to prompt a user to provide an original work of authorship and obtain the original work of authorship via user input;
- a data packager, configured to receive the original work of authorship from the user interface and create a data package comprising the original work of authorship and a set of data not related to the original work of authorship;
- a data protection engine communicatively coupled to the data packager and configured to receive the data package therefrom and add protection against unauthorized access to the data package using a technological measure such that the set of data is further protected by the DMCA's anti-circumvention provisions by virtue of being protected by the technological measure that also protects the original work of authorship; and
- a network interface, communicatively coupled to the data protection engine and configured to receive the protected data package therefrom and send the protected data package to a second computing device.

38. The system of claim 37, wherein the set of data comprises user activity data.

39. The system of claim 38, wherein the user activity data comprises at least one of a position in a book currently being read by a user, and a list of books that have been accessed by the user.

40. The system of claim 37, wherein the data protection engine is further configured to send authorization to access the data package to the second computing device.

41. The system of claim 40, wherein the authorization is limited to a specified use of the set of data.

42. The system of claim 40, wherein the authorization is only valid during a specified time range.

* * * * *